(12) United States Patent
Kishimoto

(10) Patent No.: US 6,510,252 B1
(45) Date of Patent: Jan. 21, 2003

(54) IMAGE PROCESSING METHOD AND APPARATUS

(75) Inventor: Masaki Kishimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/255,742

(22) Filed: Feb. 23, 1999

(30) Foreign Application Priority Data

Feb. 24, 1998 (JP) ............................................ 10-042215

(51) Int. Cl.$^7$ ................................................. G06K 9/46
(52) U.S. Cl. ........................ 382/252; 358/1.9; 358/3.04; 345/616
(58) Field of Search ............................... 382/251, 252, 382/167, 270–275, 237, 162, 239, 166; 358/1.9, 465, 466, 298, 429, 455–460, 534–536, 3.01–3.1; 345/150–155, 147, 616, 596

(56) References Cited

U.S. PATENT DOCUMENTS

| | | | |
|---|---|---|---|
| 5,325,211 A | * | 6/1994 | Eschbach .................... 358/466 |
| 5,621,542 A | * | 4/1997 | Ohta et al. .................. 358/455 |
| 5,757,976 A | * | 5/1998 | Shu ............................. 382/252 |
| 6,181,827 B1 | * | 1/2001 | Kishimoto .................. 382/252 |

* cited by examiner

Primary Examiner—Phuoc Tran
Assistant Examiner—Ishrat Sherali
(74) Attorney, Agent, or Firm—Crosby, Heafey, Roach & May; J. William Wigert, Jr.

(57) ABSTRACT

An image processing method and an image processing apparatus are provided to maintain image quality through simple processing while reducing the number of gradation levels of image data by error diffusion process. In an image processing apparatus, data outputted from a filter is subtracted from input image data x(i, j) at the subtracter. Data outputted from the subtracter is quantized at a quantizer. Data outputted from the quantizer is outputted as output image data y(i, j). Furthermore, the data outputted from the subtracter is subtracted from the data outputted from the quantizer at a second subtracter to produce quantization error e(i, j). At a filter section, filtering process is performed on the quantization error e(i, j). Data outputted from the filter section is inputted to the first subtracter. According to the gradation values of the input image data x(i, j), weight coefficient selecting section selects a filter coefficient, which corresponds to weight coefficient for error diffusion at the filter section, and sets it up in the filter section.

4 Claims, 11 Drawing Sheets

IMAGE PROCESSING METHOD AND APPARATUS

BACKGROUND OF THE INVENTION

1. Field of the Invention

The present invention relates to an image processing method and apparatus for reducing the number of gradation levels of image data by performing error diffusion processing.

2. Description of the Related Art

For example, when an image with a multiple-level gradation obtained through a computer or an image input device, is outputted through an image output device such as a printer with a fewer gradation level, the number of gradation levels of the image data is required to be reduced. Pseudo halftone representation has been conventionally utilized to maintain the image quality of an original image as high as possible, while reducing the number of gradation levels. Among several methods of the pseudo halftone representation, an error diffusion method capable of producing a high-quality image has been widely used for printers with two levels of output gradation, for example. It is to be noted that the error diffusion method is a method of diffusing a quantization error caused from each of target pixels into input image data of unquantized pixels near each of target pixels.

The general principle of the error diffusion method will now be described in detail with reference to Hitoshi Takaie and Mitsuo Yae, 'Gradation Conversion Technique of Digital Image Data with C', in Interface, August 1993, pp. 158–171.

The error diffusion method is a method to represent pseudo halftones by modulating quantization errors into high frequencies to be less perceptible considering a characteristic of human visual perception. FIG. 1 is a block diagram of an image processing apparatus for implementing typical error diffusion processing. The image processing apparatus comprises: subtracter 111 for subtracting output data of filter 114 described below from input image data $x(i, j)$; quantizer(shown as Q) 112 for quantizing output data of the subtracter 111 and outputting the result as output image data $y(i, j)$; subtracter 113 for subtracting output data of the subtracter 111 from output image data $y(i, j)$; and the filter 114 for performing specific filtering processing on the output data of the subtracter 113 and outputting the result to the subtracter 111. In the drawing, a quantization error caused through quantization at the quantizer 112 is represented by $e(i, j)$. Therefore, the output data of the subtracter 113 equals the quantization error $e(i, j)$. Coordinates of two directions intersecting each other at right angles are represented by 'i' and 'j', respectively. The two directions will be called i direction and j direction, respectively.

The filter 114 is a sort of linear filter. The transfer function thereof is determined to be $G(z_1, z_2)$. $Z_1$ and $z_2$ are variables in z transformation with respect to i direction and j direction, respectively. The overall configuration of the image processing apparatus shown in FIG. 1 is regarded as a two-dimensional sigma-delta modulation circuit. Therefore, the relationship of input and output in the image processing apparatus is given by expression (1) below.

$$Y(z_1, z_2) = X(z_1, z_2) + H(z_1, z_2) E(z_1, z_2) \quad (1)$$

In expression (1), $Y(z_1, z_2)$, $X(z_1, z_2)$ and $E(z_1, z_2)$ are values caused through z transformation of $y(i, j)$, $x(i, j)$ and $e(i, j)$, respectively. Transfer function $H(z_1, Z_2)$ of the filter for modulating quantization error $E(z_1, z_2)$ is given by expression (2) below.

$$H(z_1, z_2) = 1 - G(z_1, z_2) \quad (2)$$

The transfer function $H(z_1, z_2)$ represents a high-pass filter of two-dimensional finite impulse response (FIR). The high-pass filter is a filter for modulating quantization errors which determines a modulation characteristic of quantization error $E(z_1, z_2)$ modulated to a higher frequency. In the following description, filters represented by transfer functions $H(z_1, z_2)$ and $G(z_1, z_2)$ are shown as filter $H(z_1, z_2)$ and filter $G(z_1, z_2)$, respectively.

$G(z_1, z_2)$ is given by expression (3) below.

$$G(z_1, z_2) = \Sigma\Sigma g(n1, n2) z_1^{-n_1} z_2^{-n_2} \quad (3)$$

The first $\Sigma$ in expression (3) represents a sum when $n_1$ is from $-N_1$ to $M_1$. The second $\Sigma$ in expression (3) represents a sum when n2 is from $-N_2$ to $M_2$. Each of $N_1$, $M_1$, $N_2$ and $M_2$ is a prescribed positive integer. A term g(n1, n2) represents a filter coefficient, and n1=0 and n2=0 represents a target pixel.

A coefficient of $G(z_1, z_2)$, namely g(i, j), of a typical filter is given by expression (4) below, for example. The $\ast$ in the expression represents a target pixel where $g(0, 0)=0$ $$g(i, j) : \begin{bmatrix} * & 7 & 5 \\ 3 & 5 & 7 & 5 & 3 \\ 1 & 3 & 5 & 3 & 1 \end{bmatrix} / 48 \quad (4)$$

FIG. 2 shows the frequency characteristic of a filter $H(z_1, z_2)$ for modulating errors, using filter $G(z_1, z_2)$ given by expression (4). FIG. 2 shows that as for frequency, the greater the absolute value is, the higher the frequency is. Filter $G(z_1, z_2)$ and filter $H(z_1, z_2)$ using filter $G(z_1, z_2)$ given by expression (4) are called filters of Jarvis, Judice & Ninke (referred to as Jarvis' filter in the following description).

However, performing the conventional error diffusion method as described above has a problem that in highlight area (where dots are sparse) and in shadow area (where dots are dense), a pattern called "worm", characteristic of the error diffusion method, occurs, caused by the poverty of the dispersion of dots, resulting in the deterioration of the image quality.

One example of the image with the "worm" pattern caused by the poverty of the dispersion of dots is shown in FIG. 3. The figure shows the highlight part of the image, obtained by performing error diffusion processing using the above-mentioned common Jarvis' filter on the image of which gradation values differ gradually in vertical direction( referred to as lamp image in vertical direction in the following description). It is obvious in the image shown in the figure that dots are dispersed unevenly, causing a row of dots such as the mark of worm creeping, "worm" pattern, resulting in the deterioration of the image quality.

The consideration of the reason why the dispersion of dots becomes poor by performing conventional error diffusion method will now be made, by focusing on the frequency characteristic of a filter for modulating quantization errors. The frequency characteristic of Jarvis' filter shown in FIG. 2 is represented with contour lines in FIG. 4. The three-dimensional form(characteristic) of the frequency characteristic of the filter becomes clear by the representation. First, according to FIG. 4, it is obvious that the frequency characteristic of the filter is three-dimensionally asymmetrical, caused by a fact that the coefficient of the filter for modulating quantization errors is three-dimensionally asymmetrical as is shown in expression (4). Second, three-dimensional distortion is large, especially in the middle part of the frequency characteristic shown in FIG. 4, namely the characteristic part with respect to the low frequency band of quantization errors. Because the deterioration of the dispersion of dots is most remarkable in flat part, such as in highlight area or in shadow area, it is possible to be concluded that the three-dimensional distortion of the middle part of the frequency characteristic shown in FIG. 4, causes the three-dimensional inclination in the frequency characteristic of output image data, resulting in the deterioration of the dispersion of dots causing "worm" pattern.

Therefore, it is possible to be concluded that the problem of the dispersion of dots will be solved, when the characteristic with respect to the low frequency band of the filter for modulating quantization errors is improved to be more three-dimensionally symmetrical.

However, when the characteristic with respect to the low frequency band of the filter for modulating quantization errors is improved, then the distortion of the surrounding part of the frequency characteristic, namely the characteristic part with respect to the high frequency band, increases, and "worm" pattern occurs in halftone area. Therefore, with the filter for modulating quantization errors, it is difficult to accomplish a characteristic, which is three-dimensionally symmetrical in every frequency band.

SUMMARY OF THE INVENTION

It is an object of the invention to provide an image processing method and apparatus for maintaining an image quality while reducing the number of gradation levels of image data through performing error diffusion processing.

An image processing method comprises the steps of: quantizing input image data of each of pixels so as to convert the input image data into output image data assuming any of at least two quantization levels; selecting a weight coefficient for diffusing error, according to the gradation value of input image data of each of target pixels; and diffusing a quantization error, caused through quantization of each of target pixels in the step of quantizing, multiplied by the weight coefficient selected in the step of selecting weight coefficients, into input image data of unquantized pixels near each of target pixels.

An image processing apparatus comprises: means for quantizing input image data of each of pixels forming entire image data so as to convert the input image data into output image data having any of at least two quantization levels; means for selecting a weight coefficient for diffusing error, according to the gradation value of input image data of each of target pixels; and means for diffusing the quantization error caused through quantization of each of target pixels by the means for quantizing, multiplied by the weight coefficient selected by the means for selecting a weight coefficient, into input image data of unquantized pixels near each of target pixels.

According to the image processing method of the invention, input image data of each of pixels is quantized in the step of quantizing, and converted into output image data assuming any of at least two quantization levels. A weight coefficient for diffusing error is selected in the step of selecting a weight coefficient, according to the gradation value of input image data of each of target pixels. And the quantization errors, caused through quantization in the step of quantizing each of target pixels, multiplied by the weight coefficient obtained through selection in the step of selecting a weight coefficient, are diffused into input image data of unquantized pixels near each of target pixels.

According to the image processing apparatus of the invention, input image data of each of pixels is quantized by the means for quantizing, and converted into output image data assuming any of at least two quantization levels. A weight coefficient for diffusing error is selected by the means for selecting a weight coefficient, according to the gradation value of input image data of each of target pixels. And the quantization errors, caused through quantization by the means for quantizing each of target pixels, multiplied by the weight coefficient selected by the means for selecting a weight coefficient is multiplied, are diffused into input image data of unquantized pixels near the each of target pixels.

Other and further objects, features and advantages of the invention will appear more fully from the following description.

Figure 8A:
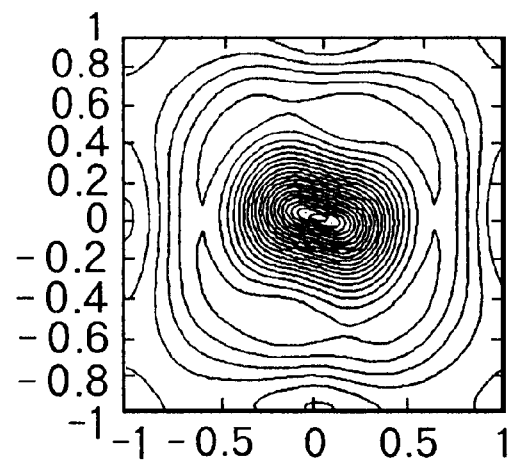
Figure 8B:
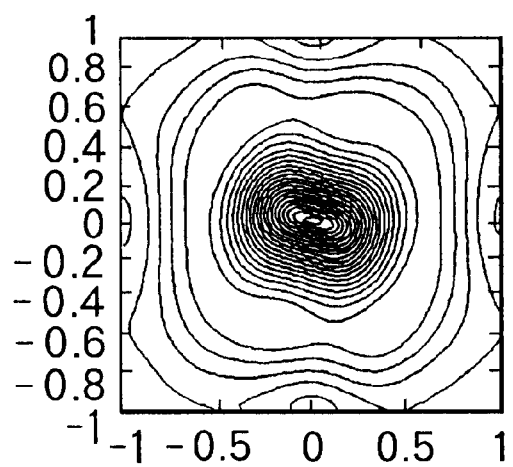
Figure 8C:
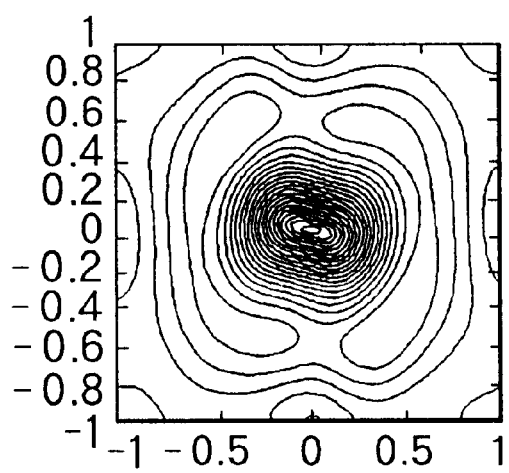

Each of FIG. 8A to FIG. 8C is an illustration of the frequency characteristic of a filter obtained through linear interpolation based on filter A and filter B, represented with contour lines.

Figure 9A:
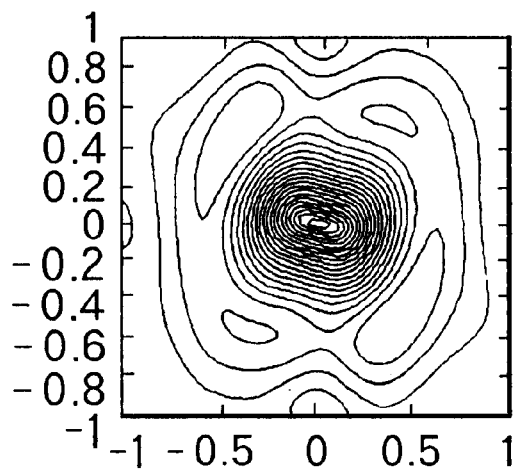
Figure 9B:
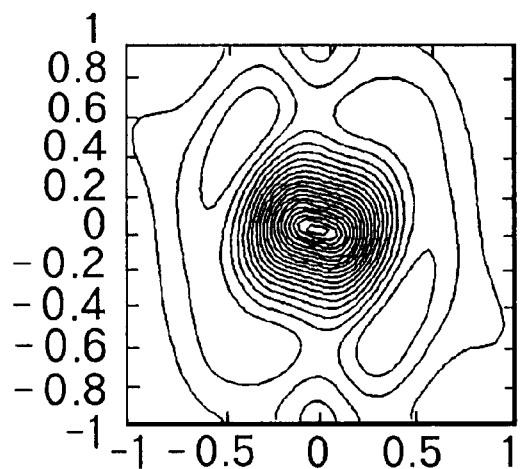
Figure 9C:
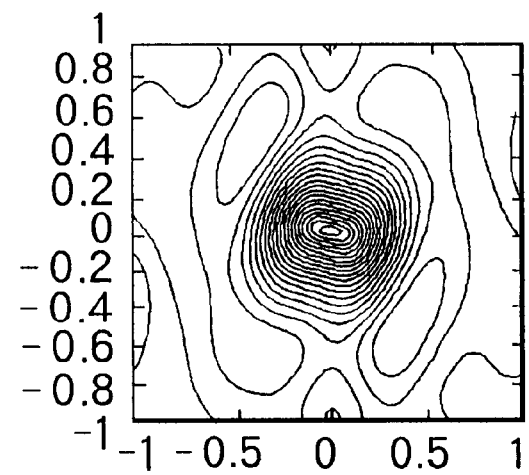

Each of FIG. 9A to FIG. 9C is an illustration of the frequency characteristic of a filter obtained through linear interpolation based on filter A and filter B, represented with contour lines.

Figure 10A:
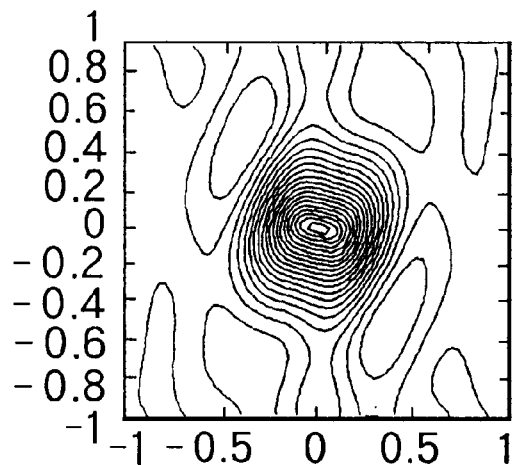
Figure 10B:
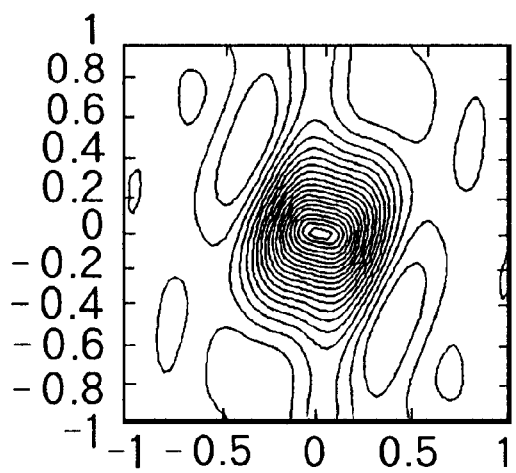
Figure 10C:
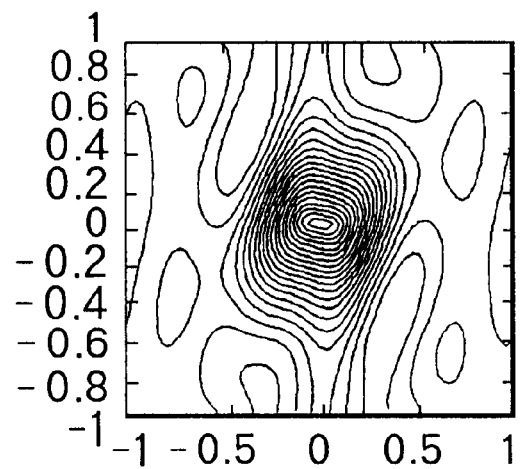

Each of FIG. 10A to FIG. 10C is an illustration of the frequency characteristic of a filter obtained through linear interpolation based on filter A and filter B, represented with contour lines.

Figure 11:
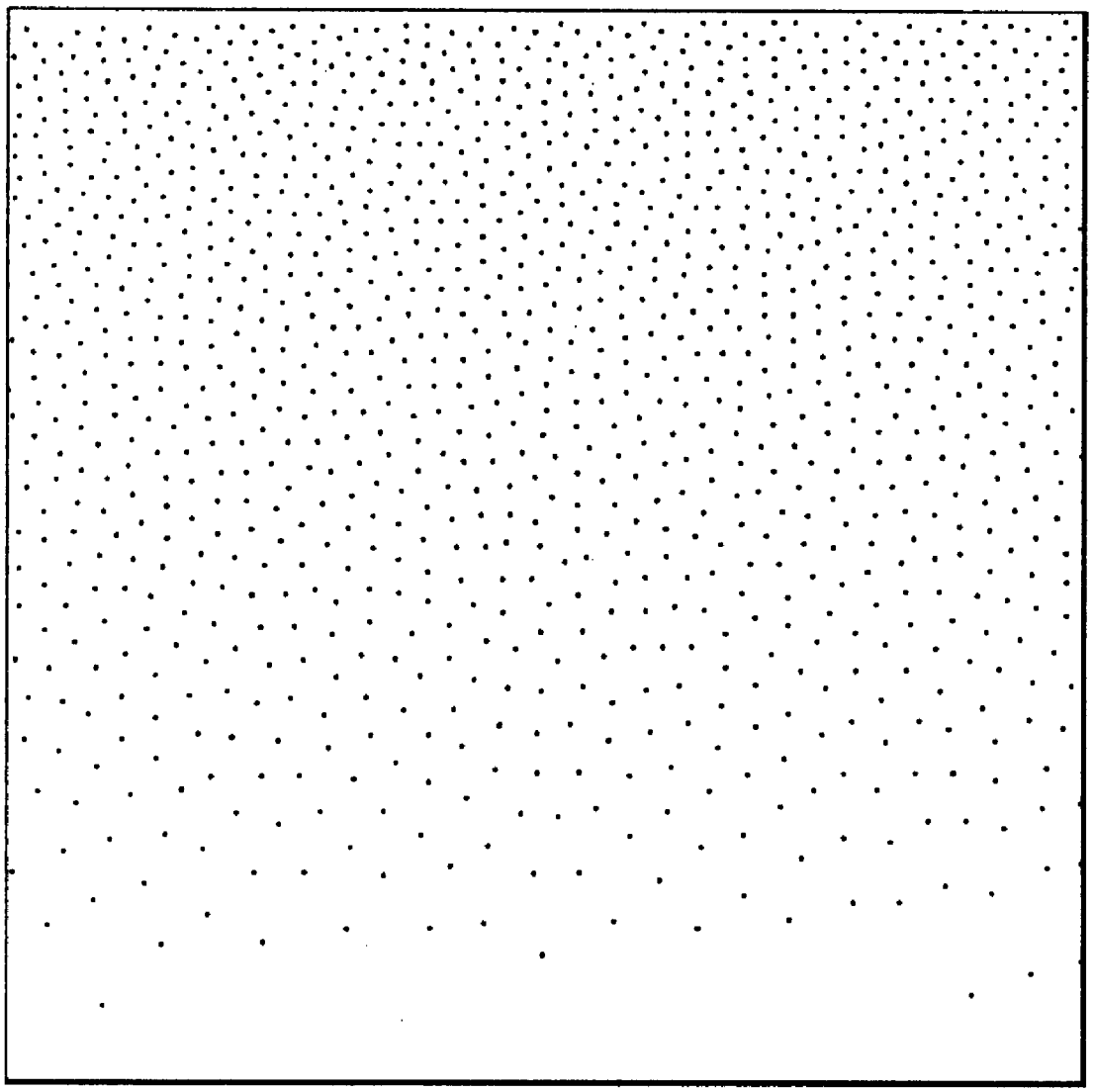

FIG. 11 is an illustration showing an image obtained by performing error diffusion processing at the image processing apparatus related to the first embodiment of the invention.

Figure 12:
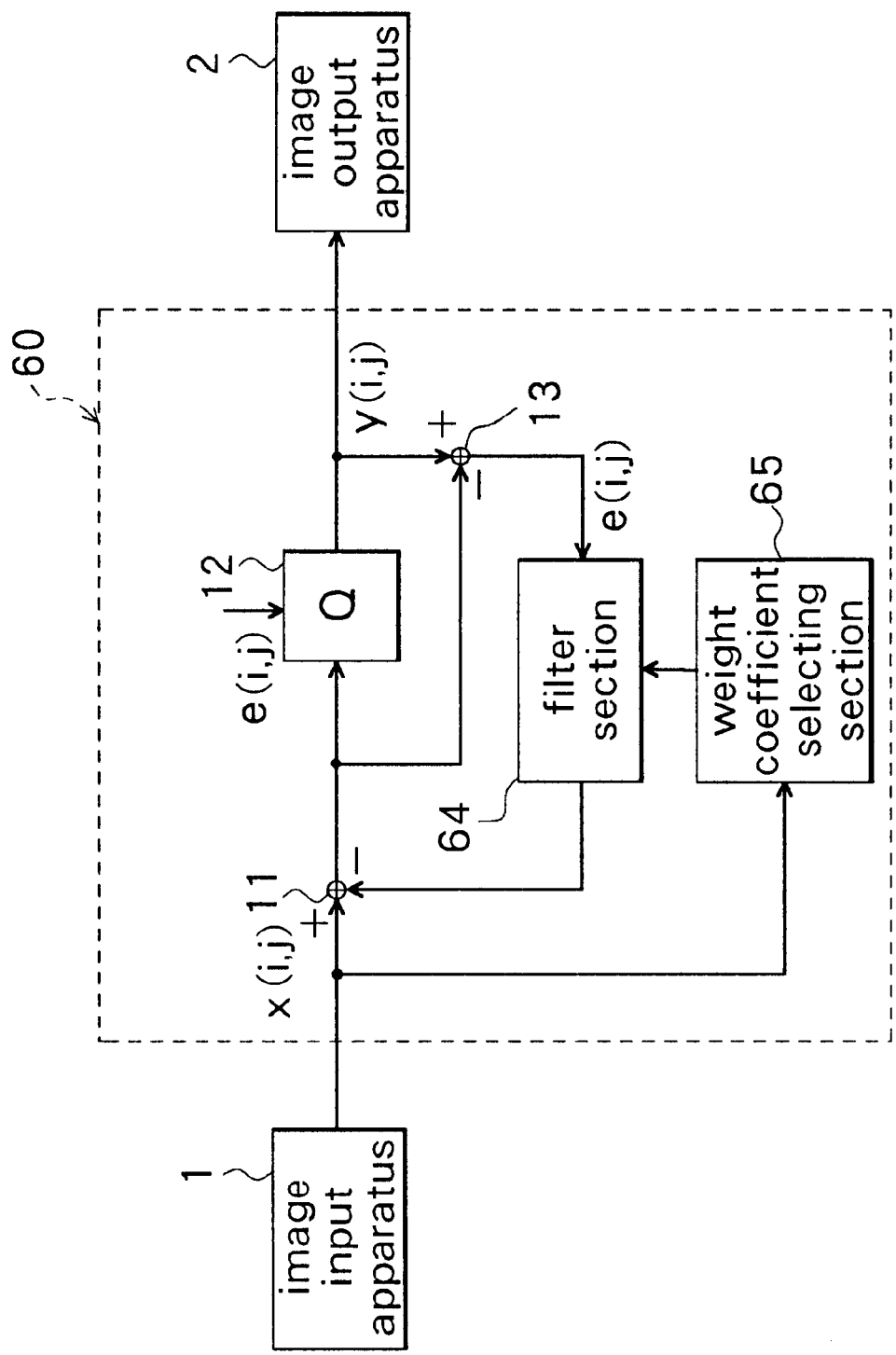

FIG. 12 is a block diagram showing a configuration of an image processing apparatus related to the second embodiment of the invention.

Figure 13:
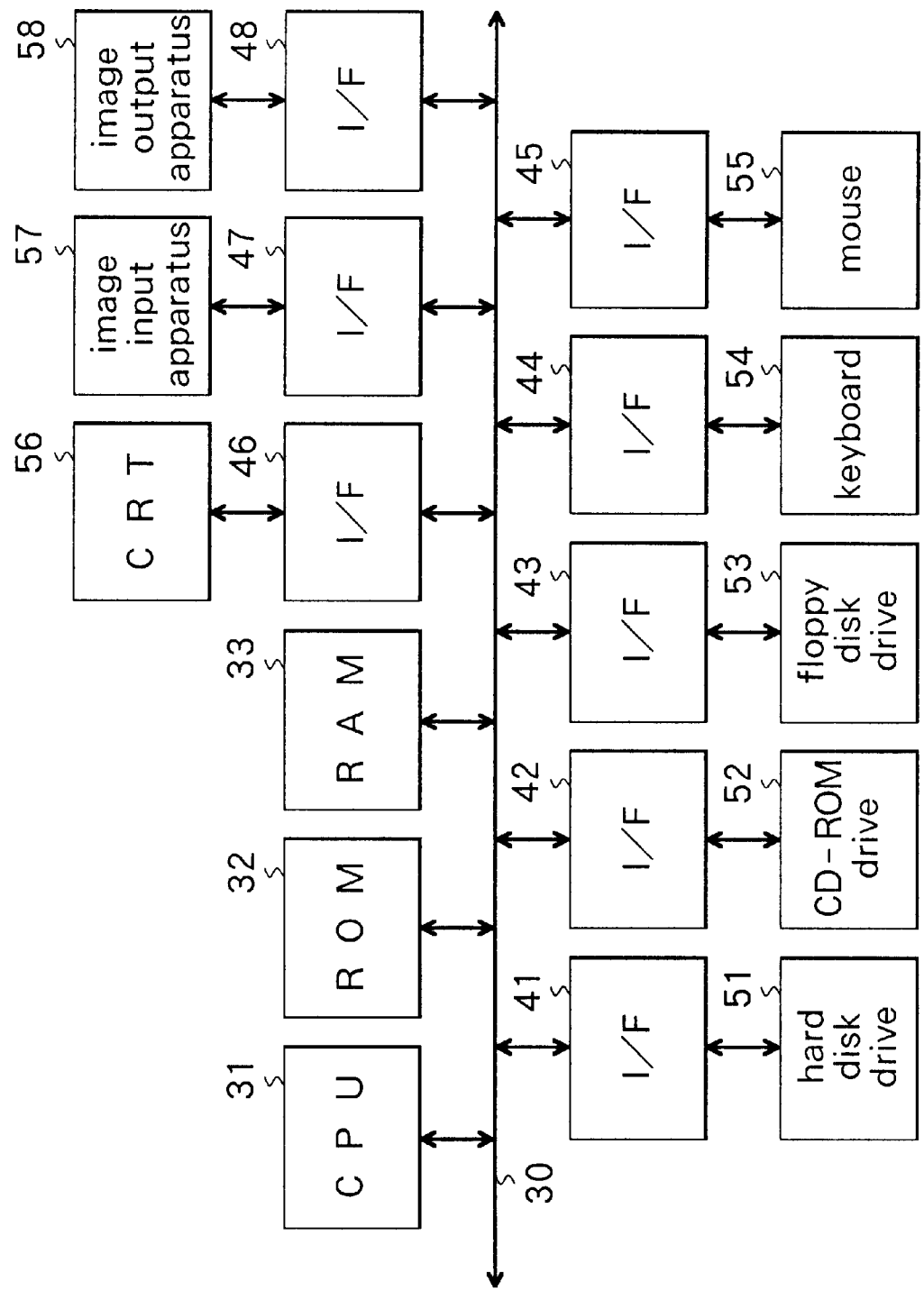

FIG. 13 is a block diagram showing a configuration of an image processing apparatus related to the third embodiment of the invention.

DETAILED DESCRIPTION OF THE PREFERRED EMBODIMENTS

The embodiments of the invention will now be described in detail with reference to the accompanying drawings. FIG.

5 is a block diagram of an image processing apparatus for implementing an image processing method of the first embodiment of the invention. Image processing apparatus 10 comprises: subtracter 11 for subtracting the output data of filter 14 described below from input image data x(i, j); quantizer (shown as Q) 12 as a quantization means for quantizing the output data of the subtracter 11 for each of pixels, based on at least one threshold value, and converting the data into output image data y(i, j) having any of at least two quantization levels; subtracter 13 for subtracting the output data of the subtracter 11 from the output data of the quantizer 12 and producing quantization error e(i, j); the filter section 14 for performing prescribed filtering processing on the output data of the subtracter 13 and outputting the result to the subtracter 11; and weight coefficient selecting section 15 for selecting the filter coefficient at the filter section 14, corresponds to the weight coefficient for diffusing error, according to gradation value of input image data x(i, j), and setting the selected filter coefficient in the filter section 14.

The filter section 14 and the subtracter 11 correspond to the means for diffusing an error, multiplying quantization error e(i, j) caused through the quantization of each of target pixels at the quantizer 12, by the weight coefficient (filter coefficient) selected at the weight coefficient selecting section 15, and diffusing the result of the multiplying into input image data of unquantized pixels near each of target pixels, and modulate the quantization error to high frequency band, with modulation characteristic defined by the weight coefficient.

The filter section 14 configures a sort of linear filter. The transfer function thereof is determined to be $G(z_1, z_2)$. $z_1$ and $z_2$ are variables in z transformation with regard to i direction and j direction, respectively. $G(z_1, z_2)$ is given by expression (3) described above. The filter section 14 may be implemented by a digital filter, for example.

Input image data x(i, j) inputted to the image processing apparatus 10 may be given by image input apparatus 1. Output image data y(i, j) outputted from the image processing apparatus 10 may be outputted to image output apparatus 2. The image input apparatus 1 may be any of an image scanner, a digital camera, a video camera and so on. The image output apparatus 2 may be any of a printer, a liquid crystal display and so on.

Besides, the image processing apparatus 10 related to the embodiment, may be provided as a single apparatus, or may be stored in an image output apparatus such as printer, for example, by transforming itself to IC(Integrated Circuit) chips, for example.

According to the embodiment, the gradation value of input image data x(i, j) is set up from "0" to "255", namely 256 steps. Each quantization level at the quantizer 12 is set up to either "0", or "255" in order to make the final output image data y(i, j) binary.

The weight coefficient selecting section 15 selects a weight coefficient so as to be, the closer the gradation level of the input image data x(i, j) of each of target pixels to either the minimum or the maximum quantization level at the quantizer 12, the more the modulation characteristic of modulating the quantization error becomes three-dimensionally symmetrical with respect to low frequency band.

To be specific, the weight coefficient selecting section 15 selects the first weight coefficient consists of plural elements, when the gradation value of input image data x(i, j) of each of target pixels belongs to the first range (12<x(i, j)<243), including the value, which is most distant from both of the minimum value "0" and the maximum value "255", among the ranges of the gradation value of input image data. The section 15 selects the second weight coefficient consists of plural elements, including different elements from the elements of the first weight coefficient, when the gradation value of the input image data x(i, j) of each of target pixels belongs to the prescribed second range (x(i, j)≦5, x(i, j)≧250), including either of the minimum value "0" or the maximum value "255", among the ranges of gradation values of the input image data. The section 15 selects a weight coefficient having elements obtained through the element-by-element linear interpolation, based on the first weight coefficient and the second weight coefficient, when the gradation value of input image data x(i, j) of each of target pixels belongs to the range between the first range and the second range.

In the following, the filter implemented in the filter section 14, with the selection of the first weight coefficient, will be referred to as filter A for halftone area, and the filter implemented in the filter section 14, with the selection of the second weight coefficient, will be referred to as filter B for highlight area. One example of the filter coefficient g(i, j) of the filter A is given by expression (5), and one example of the filter coefficient g(i, j) of the filter B is given by expression (6).

$$g(i, j): \begin{bmatrix} * & 3 & 5 \\ 3 & 4 & 3 & 4 & 3 \\ 1 & 3 & 5 & 3 & 1 \end{bmatrix} / 38 \quad (5)$$

$$g(i, j): \begin{bmatrix} * & 7 & 5 & 3 \\ 2 & 4 & 6 & 5 & 3 & 1 & 0 \\ 0 & 1 & 2 & 1 & 0 & 0 & 0 \end{bmatrix} / 40 \quad (6)$$

Figure 6:
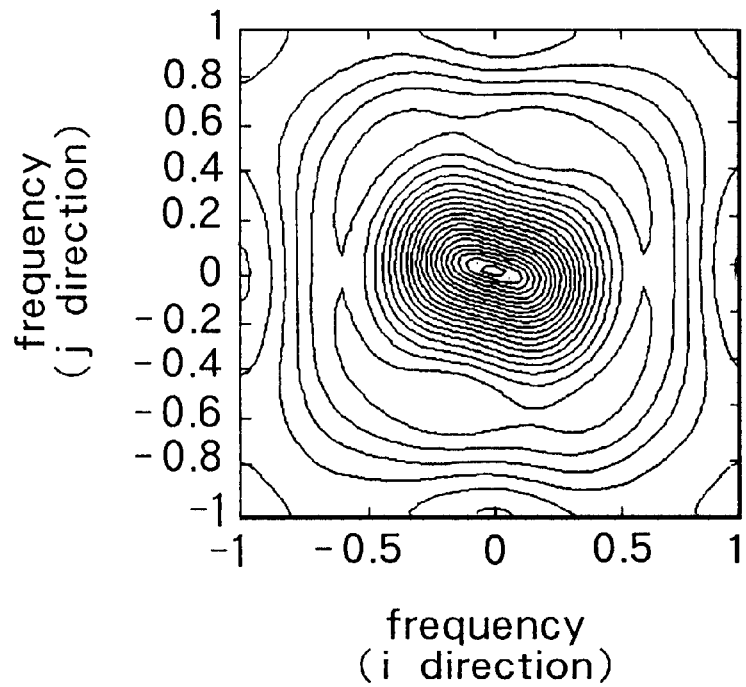
FIG. 6 is an illustration of the frequency characteristic of filter A, selected at the weight coefficient selecting section shown in FIG. 5, represented with contour lines.
Figure 7:
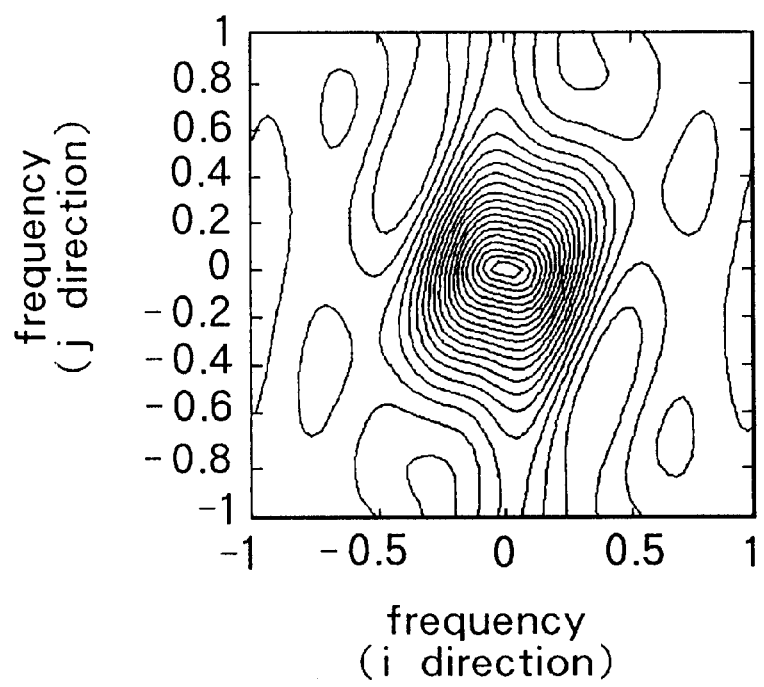
FIG. 7 is an illustration of the frequency characteristic of filter B, selected from the weight coefficient selecting section shown in FIG. 5, represented with contour lines.

FIG. 6 shows the frequency characteristic of filter $H(z_1, z_2)$ for modulating quantization errors, using filter A given by the expression (5), with contour lines. FIG. 7 shows the frequency characteristic of filter $H(z_1, z_2)$ for modulating quantization errors, using filter B given by the expression (6), with our lines.

According to FIG. 6, at the filter A for halftone area, the surrounding part, namely the characteristic part with respect to the high frequency band of quantization errors, is three-dimensionally almost symmetrical, which means that the filter is provided so as not to cause three-dimensional distortion of the texture in the halftone area. According to FIG. 7, on the other hand, at the filter B for highlight area, the middle part, namely the characteristic part with respect to the low frequency band of quantization errors, is three-dimensionally almost symmetrical(circular), which means that the filter is provided so as to disperse dots well in both of highlight area and shadow area, in order to prevent from the occurrence of "worm" pattern.

The filter implemented in the filter section 14 becomes a filter, having filter coefficients obtained through element-by-element linear interpolation based on the filter coefficient of filter A and the filter coefficient of filter B, when the gradation value of the input image data x(i, j) of each of target pixels is included in the range between the first range and the second range, namely either 6≦x(i, j)≦12 or 243≦x(i, j)≦249. Thus, the filter coefficient is switched in stages with respect to the range between the first range and the second range.

Each of FIGS. 8A, 8B, 8C, 9A, 9B, 9C, 10A, 10B, 10C shows frequency characteristic of the filter $H(z_1, z_2)$ for modulating quantization errors using each of filters while the filter coefficient is shifted in stages from the filter coefficient of filter A to the filter coefficient of filter B, with counter lines.

FIG. 8A shows the frequency characteristic corresponds to filter A. FIG. 8B shows the frequency characteristic corresponds to the filter selected when the gradation value of input image data x(i, j) is either "12" or "243". When each of filter coefficients of filter A is represented by "A", and each of filter coefficients of filter B is represented by "B", each of filter coefficients of the filter corresponds to the frequency character shown in FIG. 8B, is (7A+B)/8. FIG. 8C shows the frequency characteristic corresponds to the filter selected when the gradation value of input image data x(i, j) of each of target pixels is either "11" or "244". Each of filter coefficients of the filter corresponds to the frequency characteristic shown in FIG. 8C, is (6A+B)/8.

FIG. 9A shows the frequency characteristic corresponds to the filter selected when the gradation value of the input image data x(i, j) of each of target pixels is either "10" or "245". Each of filter coefficients of the filter corresponds to the frequency characteristic shown in FIG. 9A, is (5A+B)/8. FIG. 9B shows the frequency characteristic corresponds to the filter selected when the gradation value of the input image data x(i, j) of each of target pixels is either "9" or "246". Each of filter coefficients of the filter corresponds to the frequency characteristic shown in FIG. 9B, is (4A+4B)/8. FIG. 9C shows the frequency characteristic corresponds to the filter selected when the gradation value of the input image data x(i, j) of each of target pixels is either "8" or "247". Each of filter coefficients of the filter corresponds to the frequency characteristic shown in FIG. 9C, is (3A+5B)/8.

FIG. 10A shows the frequency characteristic corresponds to the filter selected when the gradation value of the input image data x(i, j) of each of target pixels is either "7" or "248". Each of filter coefficients of the filter corresponds to the frequency characteristic shown in FIG. 10A, is (2A+B)/8. FIG. 10B shows the frequency characteristic corresponds to the filter selected when the gradation value of the input image data x(i, j) of each of target pixels is either "6" or "249". Each of filter coefficients of the filter corresponds to the frequency characteristic shown in FIG. 10B, is (A+7B)/8. FIG. 10C shows the frequency characteristic corresponds to filter B.

Next, the operation of image processing apparatus 10 related to the embodiment will now be described. The following description applies to the image processing method related to the embodiment as well.

According to the image processing apparatus 10 related to the embodiment, the output data of filter section 14 is subtracted from input image data x(i, j) by subtracter 11. The output data of the subtracter 11 is quantized by quantizer 12, and the output data of the quantizer 12 is outputted from the image processing apparatus 10 as output image data y(i, j). And the output data of the subtracter 11 is subtracted from the output data of the quantizer 12 by subtracter 13, producing quantization error e(i, j). The quantization error e(i, j), the output data of subtracter 13, is inputted to the filter section 14, where the filtering processing will be performed on according to the filter coefficient(weight coefficient) selected at weight coefficient selecting section 15. The output data of filter section 14 is inputted to subtracter 11. The weight coefficient selecting section 15 selects a filter coefficient corresponds to the weight coefficient for diffusing error, according to the gradation value of input image data x(i, j), and sets it up in the filter section 14.

Through the operation, the image processing apparatus 10 converts the input image data x(i, j) to the output image data y(i, j) assuming either of the two quantization levels by quantizing the input image data based on one threshold value, and performs error diffusion process, in which the quantization error e(i, j) caused through the quantization is multiplied by the weight coefficient selected at the weight coefficient selecting section 15, and the result of multiplying is diffused into the input image data x(i, j) of unquantized pixels near each of target pixels.

According to the image processing method and apparatus related to the embodiment: the filter implemented by filter section 14 is filter A, in which the characteristic of modulating the quantization error with respect to high frequency band is three-dimensionally almost symmetrical, when the gradation value of the input image data x(i, j) of a target pixel is included in the first range(12<x(i, j)<243), namely halftone area; the filter implemented by the filter section 14 is filter B, in which the characteristic of modulating the quantization error with respect to low frequency band is three-dimensionally almost symmetrical, when the gradation value of the input image data x(i, j) of a target pixel is included in the second range (x(i, j)$\leq$5, x(i, j)$\geq$250), which is either highlight area or shadow area; the filter implemented by filter section 14 is the filter having filter coefficients obtained through element-by-element linear interpolation, based on the filter coefficient of the filter A and the filter coefficient of the filter B, when the gradation value of the input image data x(i, j) of a target pixel is included in the range between the first range and the second range(6$\leq$x(i, j)$\leq$12 or 243$\leq$x(i, j)$\leq$249). In this way, according to the embodiment, dots are dispersed evenly both in the highlight area and the shadow area, even in the halftone area. Therefore, according to the embodiment, the image quality is prevented from deterioration by performing error diffusion process while reducing the number of gradation levels, resulting in obtaining the high image quality with little or no "worm" pattern.

Furthermore, according to the embodiment of the invention, in the range between the first range and the second range, the filter implemented by filter section 14 is switched in stages between filter A and filter B, according to the gradation value of the input image data x(i, j) of each of target pixels. Through the operation, as the frequency characteristic of the filter transforms smoothly, avoiding the deterioration of the image caused by the discontinuous transformation of the frequency characteristic of the filter, resulting in output image data having a smooth gradation quality.

Figure 1:
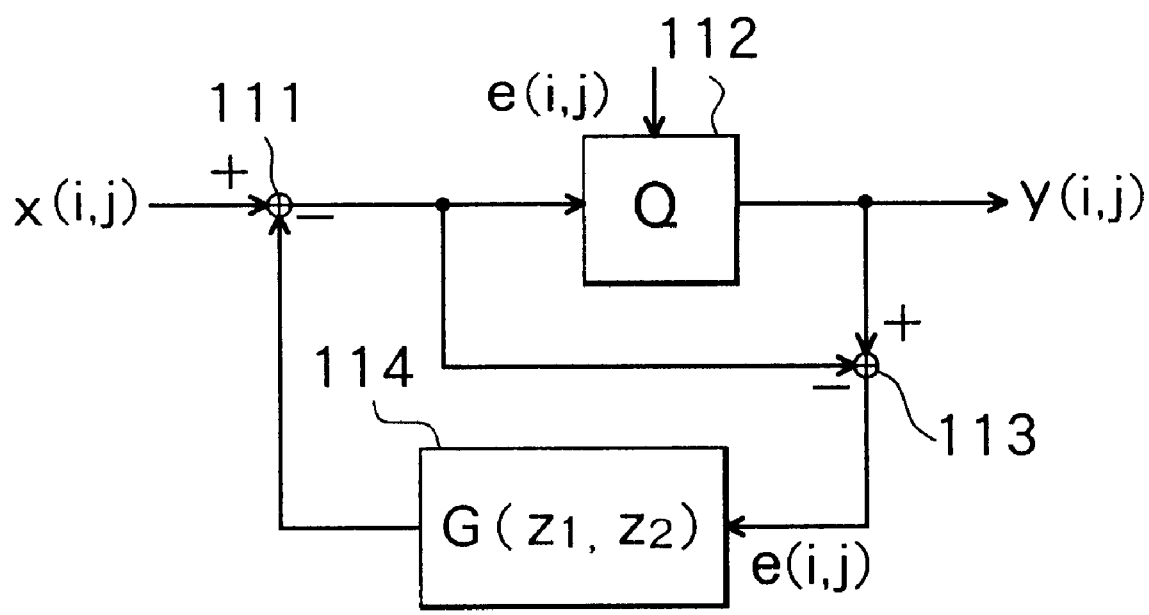
FIG. 1 is a block diagram showing the configuration of an image processing apparatus in order to implement the typical error diffusion processing.
Figure 2:
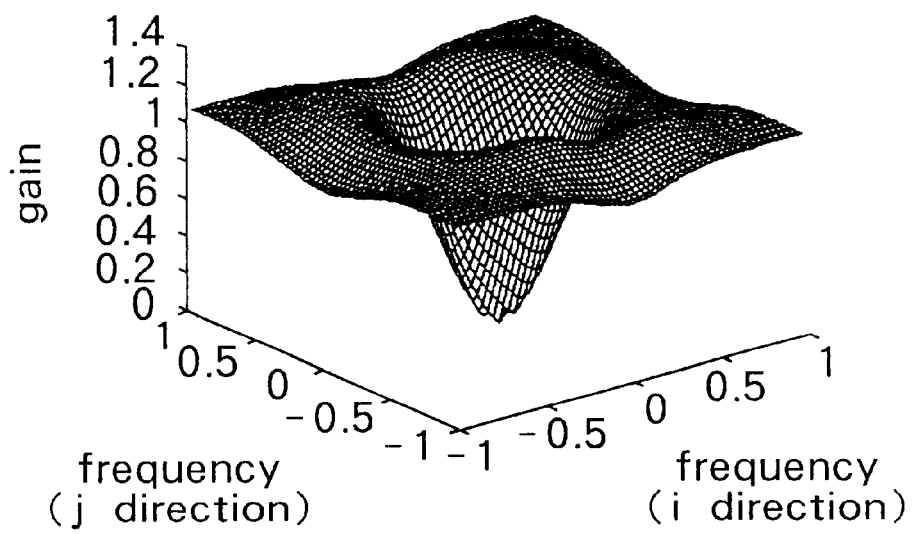
FIG. 2 is a plot showing one example of frequency characteristic of a filter used in the image processing apparatus shown in FIG. 1.
Figure 3:
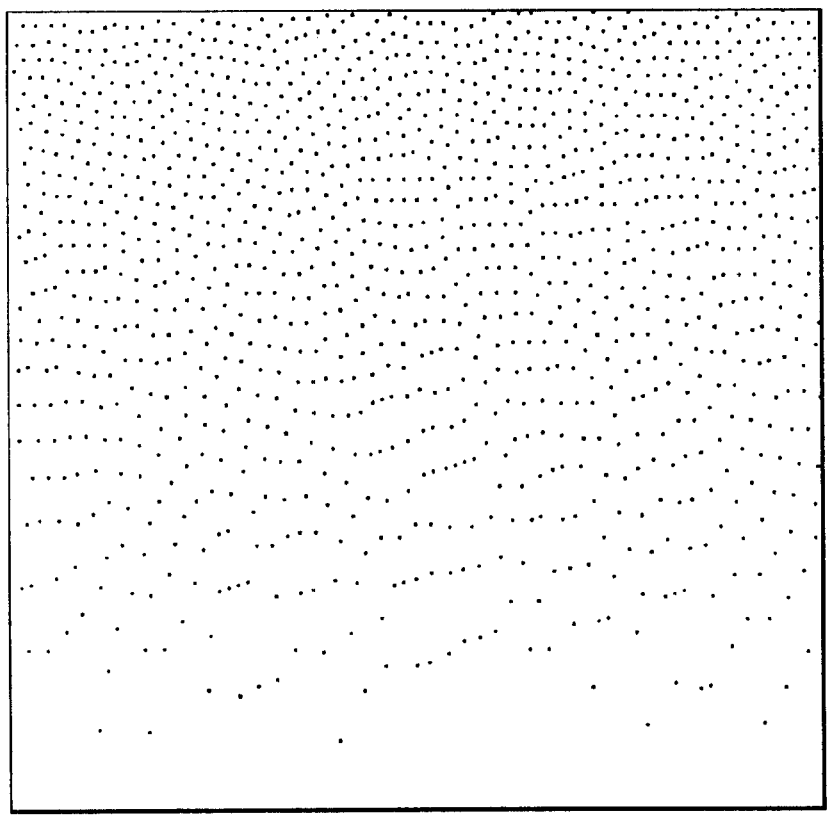
FIG. 3 is a plot showing an image obtained through error diffusion processing at the image processing apparatus shown in FIG. 1.
Figure 4:
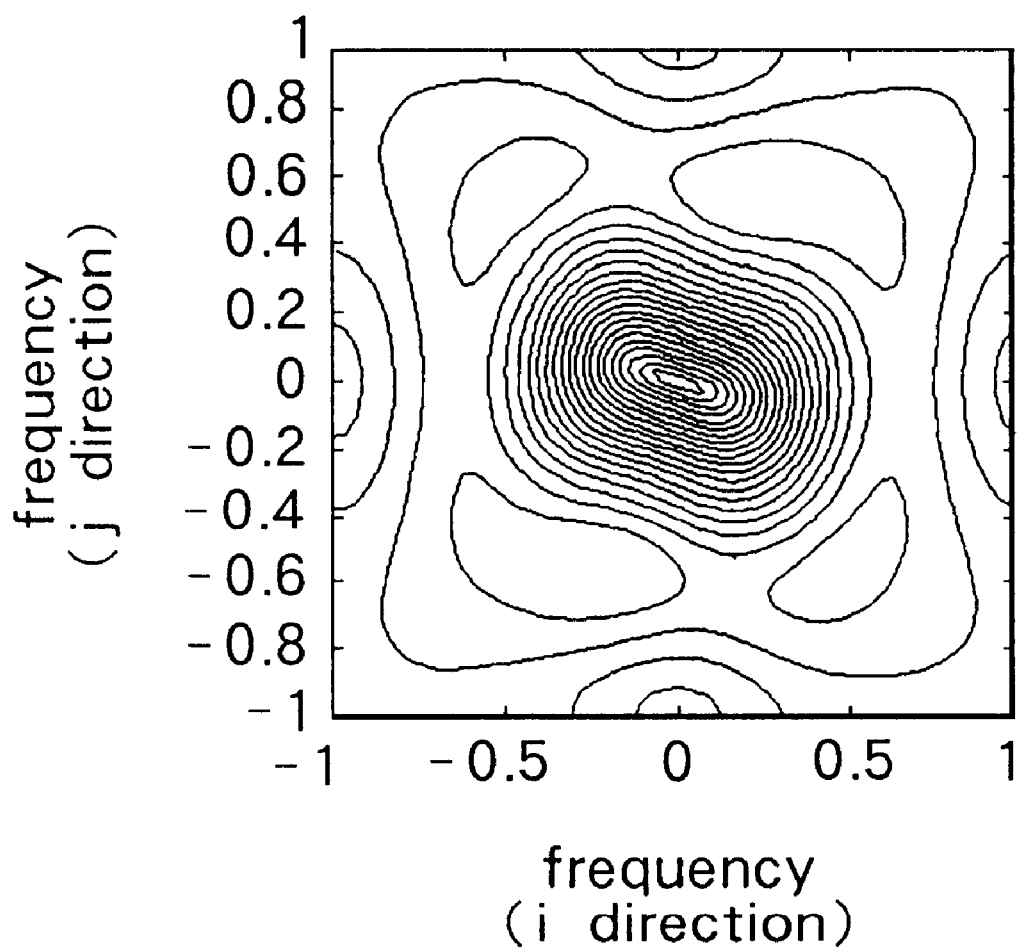
FIG. 4 is an illustration showing frequency characteristic of the filter shown in FIG. 2, represented with contour lines.

FIG. 11 shows the highlight part of the image obtained by performing error diffusion process on the lamp image in vertical direction, according to image processing apparatus 10 related to the embodiment of the invention. According to FIG. 11 in comparison with FIG. 3, it is obvious that an output image with little or no "worm" pattern with even dispersion of dots is obtained, through the embodiment of the invention.

The image processing method and apparatus of the embodiment are implemented by simply adding very simple processing (the processing of weight coefficient selecting) to the typical error diffusion processing. There is little or no increase in processing time, as compared with the typical error diffusion processing.

Figure 5:
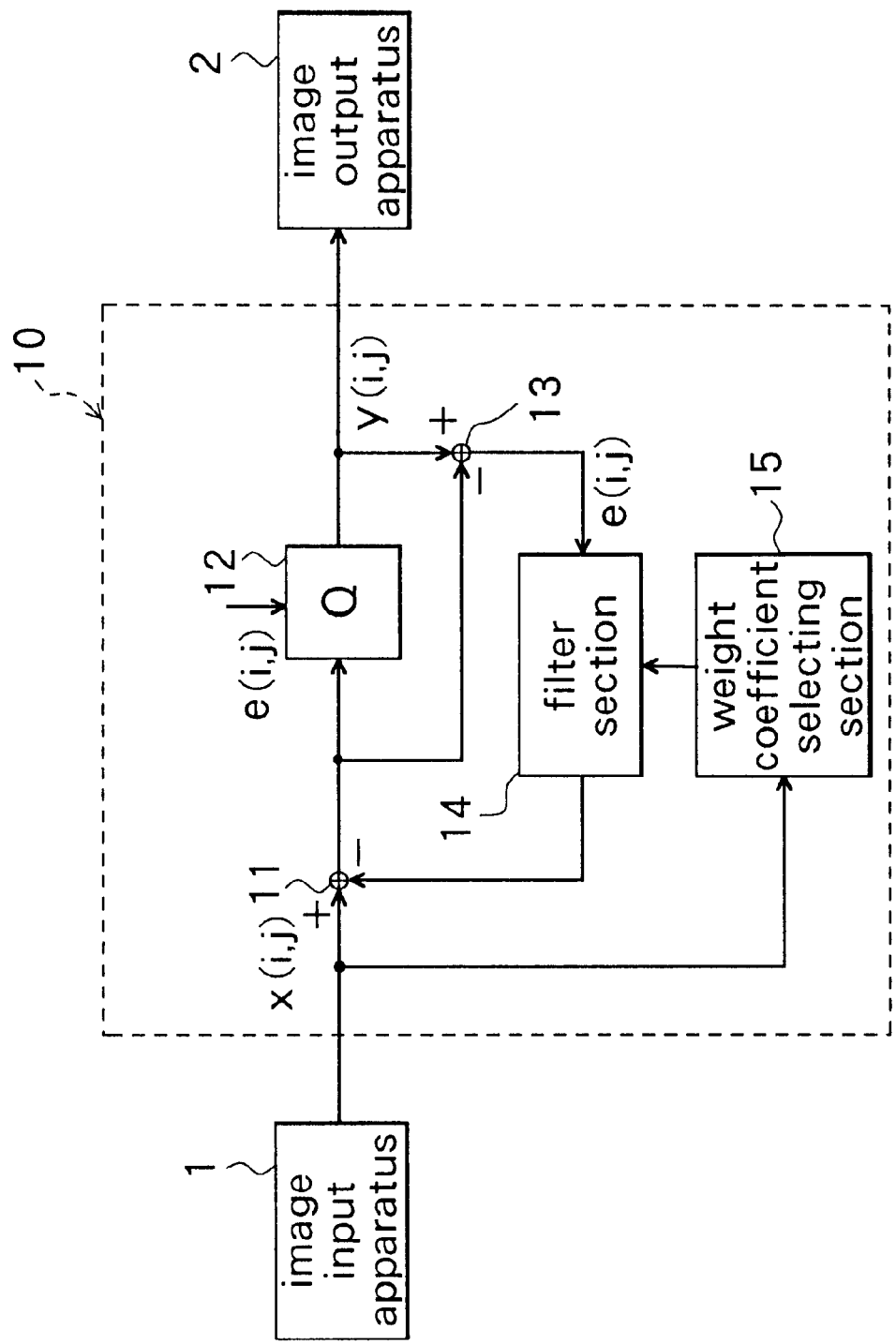
FIG. 5 is a block diagram showing the configuration of an image processing apparatus related to the first embodiment of the invention.

FIG. 12 is a block diagram of an image processing apparatus for implementing the image processing method of the second embodiment of the invention. The second embodiment is an example of using method of minimizing mean error instead of the error diffusion method. Image processing apparatus 60 related to the embodiment is provided with filter section 64 for the method of minimizing mean error, and weight coefficient selecting section 65, selecting the filter coefficient of the filter section 64 which is set up in the filter section 64. Comparing the image processing apparatus 60 with image processing apparatus 10 related to the first embodiment shown in FIG. 5, the filter section 64 is used in place of filter section 14, and the weight coefficient selecting section 65 is used in place of weight coefficient selecting section 15. The filter section 64 related to the embodiment retains quantization errors e(i, j) resulting from plural quantized pixels near a target pixel and calculates the mean error by multiplying the respective quantization errors e(i, j) by specific weight coefficient and averaging the result. The filter 64 then outputs the mean error when input image data of the target pixel is inputted. Such processing is equivalent to diffusing the quantization error resulting from a target pixel into input image data of unquantized pixels near the target pixel. The filter 64 may be implemented by a digital filter.

The remainder of configuration, operation and effects of the embodiment are similar to those of the first embodiment.

FIG. 13 is a block diagram of an image processing apparatus of the third embodiment of the invention. The embodiment is an example of implementation of a function similar to that of the image processing apparatus 10 of the first embodiment in a form of software using a computer.

The image processing apparatus of the embodiment using a computer comprises central processing unit (CPU) 31, read only memory (ROM) 32 and random access memory (RAM) 33, interconnected to one another through bus 30. The image processing apparatus further comprises hard disk drive 51, CD-ROM drive 52, floppy disk drive 53, keyboard 54, mouse 55 and cathode-ray tube (CRT) 56, each connected to the bus 30 through interfaces 41 to 46. The image processing apparatus further comprises interface 47 for connecting image input apparatus 57 to the bus 30 and interface 48 for connecting image output apparatus 58 to the bus 30.

The image input apparatus 57 may be any of an image scanner, a digital camera, a video camera and so on. The image output apparatus 58 may be any of a printer, a liquid crystal display and so on.

In the image processing apparatus of the embodiment, the CPU 31 performs the function of the image processing apparatus 10 shown in FIG. 12, by executing an application program stored on any of a hard disk platter in the hard disk drive 51, a CD-ROM driven by the CD-ROM drive 52 and a floppy disk driven by the floppy disk drive 53, with the RAM 33 as a work area.

Through the function implemented as described above, the image processing apparatus of the embodiment performs processing similar to that of the first embodiment on image data inputted by the image input apparatus 57 or image data made by the image processing apparatus (computer). Thus, output image data whose number of gradation levels is reduced is produced to be outputted to the image output apparatus 58.

The remainder of operations and effects of the embodiment are similar to those of the first embodiment.

The function similar to that of the image processing apparatus 60 of the second embodiment may be implemented in a form of software using a computer as in the third embodiment.

The present invention is not limited to the embodiments described so far but may be practiced in still other ways. For example, the quantization levels, the number of quantization levels, the filter characteristics and so on are those for illustrating purposes and may be determined depending on a mode of application of the present invention.

Besides, when the gradation value of the input image data of a target pixel belongs to the range between the first range and the second range, a filter coefficient may be switched according to the gradation value of input image data, by transforming filter section 14 to suitable filter, filter coefficients of which being a function of the gradation value of input image data, instead of obtaining a filter coefficient of a filter implemented by the filter section 14, through performing element-by-element linear interpolation, based on the filter coefficient of filter A and the filter coefficient of filter B.

Input image data is quantized based on a single threshold value and converted into output image data of two gradation levels in the foregoing embodiments. In addition, the invention may be applied to a case wherein input image data is quantized based on two threshold values or above and converted into output image data of three gradation levels or above.

The invention is effective to reduce the number of gradation levels of image data to be outputted to an ink-jet printer, a fusing thermal transfer printer, a thermoautochrome printer, a display for representing fewer gradation levels and so on. In addition, the invention is effective to reduce the number of gradation levels of image data in order to lighten the burden of image processing and storage of image data.

According to the image processing method or apparatus of the invention, as described so far, input image data of each of pixels is quantized and converted into output image data having any of at least two quantization levels. A weight coefficient for diffusing error is selected according to the gradation value of input image data of each of target pixels. The quantization error, caused by quantization of a target pixel, multiplied by the weight coefficient selected according to the gradation value of input image data of each of target pixels, is diffused into input image data of unquantized pixels near each of target pixels. As a result, the image quality is maintained while reducing the number of gradation levels of image data through error diffusion process.

According to an aspect of the image processing method or the apparatus of the invention: the first weight coefficient having plural elements is selected when the gradation value of input image data of a target pixel belongs to the first range, including the most distant value from both of the minimum value and the maximum value, among the ranges of the gradation value of input image data; the second weight coefficient, having plural elements including different elements from the elements of the first weight coefficient, is selected when the gradation value of input image data of a target pixel belongs to the prescribed second range, including either the minimum value or the maximum value, among the ranges of the gradation value of input image data; and the weight coefficient having elements obtained through element-by-element linear interpolation based on the first weight coefficient and the second weight coefficient is selected, when the gradation value of input image data of a target pixel belongs to the range between the first range and the second range. As a result, the deterioration of an image caused by the discontinuous switching of weight coefficients are avoided, resulting in obtaining output image data with smooth gradation quality.

Obviously, many modifications and variations of the present invention are possible in the light of the above teachings. It is therefore to be understood that within the scope of the appended claims the invention may be practiced otherwise than as specifically described.

What is claimed is:

1. An image processing method comprising the steps of:

quantizing input image data of each pixel so as to convert the input image data into output image data assuming at least a minimum and a maximum level;

selecting a weight coefficient for diffusing error, according to a gradation value of the input image data of each target pixels; and diffusing a quantization error, caused through quantization of target pixels in the step of quantizing, multiplied by the weight coefficient selected in the step of selecting weight coefficients, into input image data of unquantized pixels near each of target pixels;

wherein the quantization error is modulated to the frequency band of a filter with a modulation characteristic according to the weight coefficient in the step of diffusing quantization error, and the weight coefficient is selected in the step of selecting a weight coefficient, so that the closer the gradation value of the input image data of a target pixel to either the minimum or the maximum quantization level in the step of quantizing, the more the modulation characteristic of the quantization error becomes three-dimensionally symmetrical with respect to the low frequency band of the filter.

2. An image processing method comprising the steps of:

quantizing input image data of each pixel so as to convert the input image data into output image data assuming at least a minimum and a maximum level;

selecting a weight coefficient for diffusing error, according to a gradation value of input image data of each target pixels; and diffusing a quantization error, caused through quantization of target pixels in the step of quantizing, multiplied by the weight coefficient selected in the step of selecting weight coefficients, into input image data of unquantized pixels near each of target pixels;

wherein the step of selecting weight coefficients includes the steps of:

selecting a first weight coefficient having plural elements, when the gradation value of input image data of a target pixel belongs to a first range including a most distant value from both the minimum value and a maximum value among the ranges of the gradation value of input image data;

selecting a second weight coefficient, having plural elements including elements different from the elements of the first weight coefficient when the gradation value of input image data of a target pixel belongs to a prescribed second range, including either the minimum value or the maximum value among ranges of the gradation value of input image data; and selecting the weight coefficient having elements obtained through element-by-element linear interpolation based on the first weight coefficient and the second weight coefficient when the gradation value of input image data of a target pixel is included in the range between the first range and the second range.

3. An image processing apparatus comprising:

means for quantizing input image data of each pixel forming entire image data so as to convert the input image data into output image data having at least a minimum and a maximum level;

means for selecting a weight coefficient for diffusing error, according to a gradation value of the input image data of each target pixels; and means for diffusing a quantization error, caused through quantization of target pixels by the means for quantizing, multiplied by the weight coefficient selected by the means for selecting a weight coefficient, into input image data of unquantized pixels near each of target pixels;

wherein the quantization error is modulated to the frequency band of a filter with a modulation characteristic according to the weight coefficient by the means for diffusing quantization error, and the weight coefficient is selected by the means for selecting a weight coefficient, so that the closer the gradation value of the input image data of a target pixel to either the minimum or the maximum quantization level by the means for quantizing, the more the modulation characteristic of the quantization error becomes three-dimensionally symmetrical with respect to the low frequency band of the filter.

4. An image processing apparatus comprising:

means for quantizing input image data of each pixel forming entire image data so as to convert the input image data into output image data having at least a minimum and a maximum level;

means for selecting a weight coefficient for diffusing error, according to a gradation value of input image data of each target pixels; and means for diffusing a quantization error, caused through quantization of target pixels by the means for quantizing, multiplied by the weight coefficient selected by the means for selecting a weight coefficient, into input image data of unquantized pixels near each of target pixels;

wherein the means for selecting weight coefficient selects:

a first weight coefficient having plural elements, when the gradation value of input image data of a target pixel belongs to a first range including a most distant value from both the minimum value and a maximum value among the ranges of the gradation value of input image data;

a second weight coefficient, having plural elements including elements different from the elements of the first weight coefficient, when the gradation value of input image data of a target pixel belongs to a prescribed second range, including either the minimum value of the maximum value among ranges of gradation value of input image data; and the weight coefficient having elements obtained through element-by-element linear interpolation based on the first weight coefficient and the second weight coefficient, when the gradation value of input image data of a target pixel belongs to the range between the first range and the second range.

* * * * *